US010345511B2

(12) United States Patent
Sun et al.

(10) Patent No.: US 10,345,511 B2
(45) Date of Patent: Jul. 9, 2019

(54) BACKLIGHT SOURCE MODULE AND DISPLAY DEVICE

(71) Applicants: BOE TECHNOLOGY GROUP CO., LTD., Beijing (CN); HEFEI BOE DISPLAY LIGHTING CO., LTD., Hefei, Anhui (CN)

(72) Inventors: Wenbo Sun, Beijing (CN); Qiping Zhang, Beijing (CN); Yaling Kang, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

(*) Notice: Subject to any disclaimer, the term of this patent is extended or adjusted under 35 U.S.C. 154(b) by 28 days.

(21) Appl. No.: 15/325,188

(22) PCT Filed: Feb. 26, 2016

(86) PCT No.: PCT/CN2016/074659
§ 371 (c)(1),
(2) Date: Jan. 10, 2017

(87) PCT Pub. No.: WO2017/049868
PCT Pub. Date: Mar. 30, 2017

(65) Prior Publication Data
US 2017/0299804 A1 Oct. 19, 2017

(30) Foreign Application Priority Data
Sep. 22, 2015 (CN) .......................... 2015 1 0607853

(51) Int. Cl.
F21V 7/04 (2006.01)
F21V 8/00 (2006.01)
(Continued)

(52) U.S. Cl.
CPC ......... *G02B 6/0088* (2013.01); *G02B 6/0055* (2013.01); *G02F 1/133308* (2013.01);
(Continued)

(58) Field of Classification Search
CPC ................ G02B 6/0088; G02B 6/0055; G02F 1/133308
(Continued)

(56) References Cited

U.S. PATENT DOCUMENTS 7,545,459 B2 * 6/2009 Fujiwara ............... H04M 1/035
349/58
2007/0002208 A1 1/2007 Kim et al.
(Continued)

FOREIGN PATENT DOCUMENTS

CN 103363399 A 10/2013
CN 103376596 A 10/2013
(Continued)

OTHER PUBLICATIONS

Second Chinese Office Action, for Chinese Patent Application No. 201510607853.6, dated Nov. 6, 2017, 16 pages.
(Continued)

*Primary Examiner* — Matthew J. Peerce
(74) *Attorney, Agent, or Firm* — Kinney & Lange, P.A.

(57) ABSTRACT

The present disclosure provides a backlight source module including a backplate; a bottom reflective sheet, a light guide plate and an optical sheet which are stacked on the backplate in that order; and a frame disposed at peripheral edges of the backplate for holding the bottom reflective sheet, the light guide plate and the optical sheet on the backplate. The backlight source module further includes a gap adjusting element configured to adjust a gap between the optical sheet and the frame in a direction perpendicular to the backplate.

18 Claims, 2 Drawing Sheets

(51) Int. Cl.
*G02F 1/1333* (2006.01)
*G02F 1/1335* (2006.01)

(52) U.S. Cl.
CPC .............. *G02F 1/133615* (2013.01); *G02F 2001/133317* (2013.01); *G02F 2201/503* (2013.01); *G02F 2201/505* (2013.01)

(58) Field of Classification Search
USPC ........................................ 362/606
See application file for complete search history.

(56) References Cited

U.S. PATENT DOCUMENTS

| | | | | |
|---|---|---|---|---|
| 2015/0170582 | A1* | 6/2015 | Shimizu | G02F 1/133308 345/206 |
| 2015/0260908 | A1* | 9/2015 | Kiguchi | G02B 6/0051 349/58 |
| 2015/0268411 | A1* | 9/2015 | Hu | G02B 6/0088 362/609 |
| 2017/0205569 | A1* | 7/2017 | Sugimoto | G02B 6/0088 |

FOREIGN PATENT DOCUMENTS

| | | |
|---|---|---|
| CN | 104298000 A | 1/2015 |
| CN | 104412314 A | 3/2015 |
| CN | 104570478 A | 4/2015 |
| CN | 105093683 A | 11/2015 |
| EP | 2840306 A1 | 2/2015 |
| JP | 2007193238 A | 8/2007 |
| JP | 2008058709 A | 3/2008 |
| TW | 200848876 A | 12/2008 |
| WO | 2012141084 A1 | 10/2012 |
| WO | 2015025814 A1 | 2/2015 |

OTHER PUBLICATIONS

International Search Report and Written Opinion (including English translation of Box V.) dated Jun. 22, 2016, for corresponding PCT Application No. PCT/CN2016/07459.

First Chinese Office Action, for Chinese Patent Application No. 201510607853.6, dated Jul. 27, 2017, 11 pages.

\* cited by examiner

BACKLIGHT SOURCE MODULE AND DISPLAY DEVICE

CROSS-REFERENCE TO RELATED APPLICATION

This application is a Section 371 National Stage Application of International Application No. PCT/CN2016/074659, filed on Feb. 26, 2016, entitled "BACKLIGHT SOURCE MODULE AND DISPLAY DEVICE", which has not yet published, which claims priority to Chinese Application No. 201510607853.6, filed on Sep. 22, 2015, incorporated herein by reference in their entirety.

BACKGROUND OF THE DISCLOSURE

Field of the Disclosure

Embodiments of the present disclosure relate to a field of display technology, in particular, to a backlight source module for a display device.

Description of the Related Art

A liquid crystal display, as a kind of display device, mainly includes a liquid crystal panel and a backlight source. According to light source types, the backlight source may be mainly classified into a light emitting diode (abbreviated as LED) backlight source and a cold cathode fluorescent lamp (abbreviated as CCFL) backlight source. According to sizes, the backlight source may be mainly classified into the backlight sources for a mobile phone, a tablet, a notebook computer, a monitor, a television and so on. In recent years, the LED back light source has become a trend in the field of liquid crystal display backlight source because of its superior optical effect and thinning of the display device.

An existing backlight source module for display device typically comprises a backplate, a bottom reflective sheet, a light guide plate and an optical sheet which are stacked on the backplate in that order, and a frame disposed at peripheral edges of the backplate for holding the bottom reflective sheet, the light guide plate and the optical sheet on the backplate.

Typically, in the development process, the backlight source module needs to undergo a series of tests, such as vibration test, hot and cold impact test, high-temperature and high-humidity test, drop test and so on. In the development process of the backlight source module, a gap between the frame and the optical sheet is required to satisfy requirements of both the vibration test and the high-temperature and high-humidity test. On one hand, if the gap between the frame and the optical sheet is large, the optical sheet will move on a surface of the light guide plate during the vibration test of the backlight source module. Such a movement will cause a physical friction, thereby leading to harmful scratch on the backlight source or scraps from the optical sheet. On the other hand, if the gap between the frame and the optical sheet is small, during the high-temperature and high-humidity test, the expansion of both the light guide plate and the optical sheet will further compress the gap, thereby leading to sheet wrinkle of the backlight source module. Therefore, it is difficult to set the gap between the frame and the optical sheet, so that it is difficult to pass through the reliability test in the development process, thereby affecting the development process of the backlight source module adversely.

SUMMARY

According to an aspect of the present disclosure, it is provided a backlight source module comprising:

a backplate;

a bottom reflective sheet, a light guide plate and an optical sheet which are stacked on the backplate in that order; and a frame disposed at peripheral edges of the backplate for holding the bottom reflective sheet, the light guide plate and the optical sheet on the backplate, wherein the backlight source module further comprises a gap adjusting element configured to adjust a gap between the optical sheet and the frame in a direction perpendicular to the backplate.

According to an embodiment, the frame comprises:

a first stepped portion engaging with an edge of the optical sheet; and a second stepped portion engaging with an edge of the light guide plate, wherein the first stepped portion projects towards a center of the backlight source module from the second stepped portion.

According to an embodiment, the gap adjusting element is disposed between the second stepped portion of the frame and the light guide plate.

According to an embodiment, the gap adjusting element is disposed in a recess of the frame.

According to an embodiment, a thermal expansion coefficient of the gap adjusting element is larger than a thermal expansion coefficient of the frame.

According to an embodiment, the frame is made of polycarbonate or glass fiber reinforced polycarbonate, and the gap adjusting element is made of polyvinyl chloride or ABS resin.

According to an embodiment, an end of the frame contacting the optical sheet employs a rounded corner design.

According to an embodiment, an end of the frame contacting the light guide plate employs a rounded corner design.

According to an embodiment, an end of the first stepped portion of the frame contacting the optical sheet employs a rounded corner design.

According to an embodiment, an end of the second stepped portion of the frame contacting the light guide plate employs a rounded corner design.

According to an embodiment, there is a gap between the frame and a side portion of the optical sheet.

According to an embodiment, there is a gap between the frame and a side portion of the light guide plate.

According to another aspect of the present disclosure, it is provided a display device comprising the backlight source module as described above.

BRIEF DESCRIPTION OF THE DRAWINGS

In order to make objectives, features and advantages of the present disclosure become more apparent, the present disclosure will be further described with reference to the accompanying drawings and specific embodiments.

DETAILED DESCRIPTION OF PREFERRED EMBODIMENTS OF THE DISCLOSURE

In the following detailed description, for purposes of explanation, numerous specific details are set forth in order to provide a thorough understanding of the disclosed embodiments. It will be apparent, however, that one or more embodiments may be practiced without these specific details. In other cases, well-known structures and devices are shown in diagrammatic ways to simplify the drawings.

Figure 1:
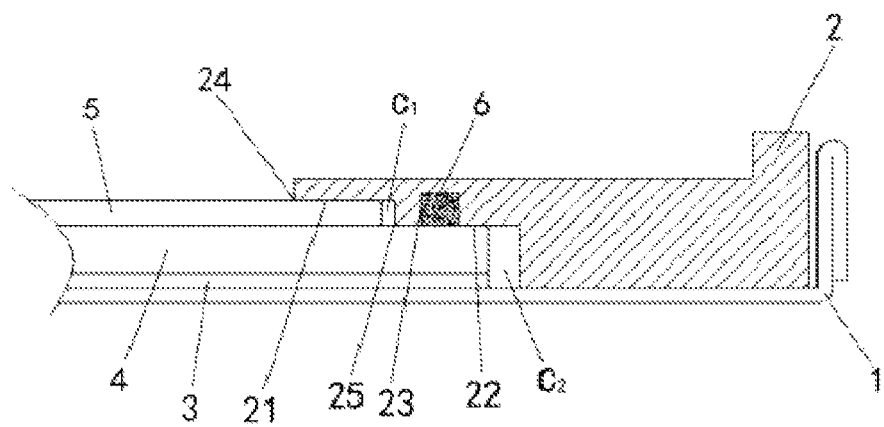
FIG. 1 is a partial sectional view of a structure of a backlight source module according to an embodiment of the present disclosure.

FIG. 1 is a partial sectional view of a structure of a backlight source module according to an embodiment of the present disclosure. As shown in FIG. 1, the backlight source module comprises a backplate 1, a bottom reflective sheet 3, a light guide plate 4 and an optical sheet 5 which are stacked on the backplate 1 in that order, and a frame 2. The frame 2 is disposed at peripheral edges of the backplate 1 for holding the bottom reflective sheet 3, the light guide plate 4 and the optical sheet 5 on the backplate 1.

According to an embodiment, as shown in FIG. 1, the frame 2 comprises a first stepped portion 21 and a second stepped portion 22. The first stepped portion 21 projects towards a center of the backlight source module from the second stepped portion 22. The first stepped portion 21 engages with an edge of the optical sheet 5. The second stepped portion 22 engages with an edge of the light guide plate 4.

Typically, during a process of developing the backlight source module, for example, during a vibration test, a gap between the optical sheet and the frame is required to be small, so as to prevent the optical sheet from moving on a surface of the light guide plate. Otherwise, such a movement will cause a physical friction between the optical sheet and the light guide plate, thereby leading to harmful scratch on the backlight source or scraps from the optical sheet. Also, during a high-temperature and high-humidity test, the gap between the optical sheet and the frame is required to be large to allow both the light guide plate and the optical sheet to be expanded, so as to avoid sheet wrinkle due to a pressure generated between the optical sheet and the frame.

Therefore, according to a general concept of the present disclosure, a gap adjusting element is provided in the backlight source module, and the gap adjusting element is configured to adjust the gap between the optical sheet and the frame in a direction perpendicular to the backplate. In this way, in the vibration test, the gap between the optical sheet and the frame is allowed to be small, so as to avoid the harmful scratch on the backlight source or the scraps from the optical sheet due to the physical friction caused by the movement of the optical sheet on the surface of the light guide plate. Also, during the high-temperature and high-humidity test, the gap between the optical sheet and the frame is allowed to be large, so as to avoid sheet wrinkle of the backlight source module due to the pressure generated between the optical sheet and the frame when both the light guide plate and the optical sheet are expanded. In other words, the backlight source module according to the embodiments of the present disclosure is capable of preventing harmful scratch or scraps during the vibration test and preventing sheet wrinkle during the high-temperature and high-humidity test so as to improve the reliability of the backlight source module.

FIG. 1 shows a partial sectional view of the structure of the backlight source module in a normal use state. As shown in FIG. 1, the gap between the frame 2 and the optical sheet 5 is very small, for example, the frame 2 substantially closely presses against the optical sheet 5. In this way, in the vibration test, the optical sheet 5 together with the light guide plate 4 and the bottom reflective sheet 3 beneath it are pressed onto the backplate 1 by the frame 2, and the optical sheet 5 together with the light guide plate 4 and the bottom reflective sheet 3 are not easily moved relative to each other, so as to avoid the harmful scratch or the scraps.

Figure 2:
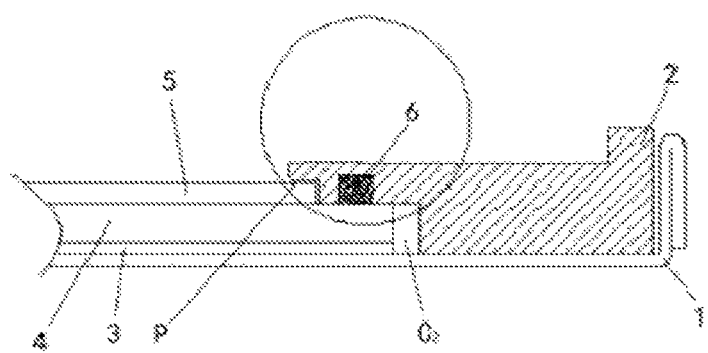
FIG. 2 is a partial sectional view of the structure of the backlight source module shown in FIG. 1 in a high-temperature and high-humidity test.
Figure 3:
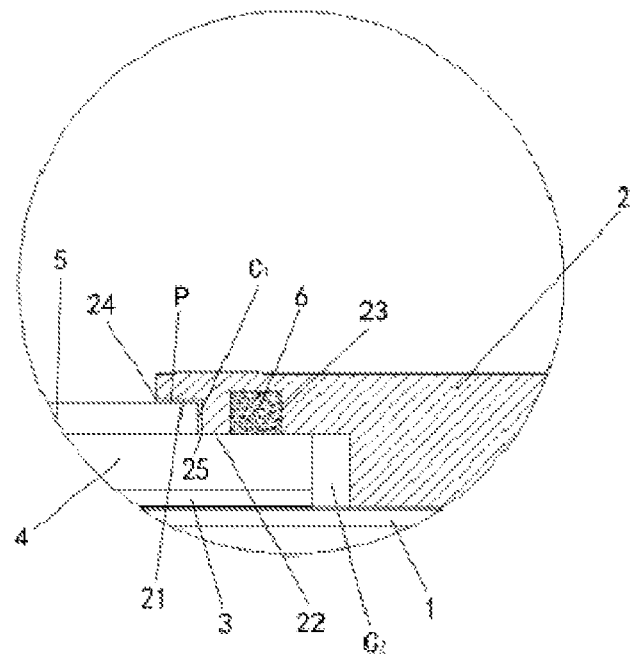
FIG. 3 is a partial enlarged view of a circular part in FIG. 2.

FIG. 2 shows a partial sectional view of the structure of the backlight source module shown in FIG. 1 in the high-temperature and high-humidity test, and FIG. 3 is a partial enlarged view of a circular part in FIG. 2. As shown in FIGS. 2 and 3, in the high-temperature and high-humidity test, the gap adjusting element 6 adjusts the gap between the optical sheet 5 and the frame 2 so that a larger gap P is generated between the optical sheet 5 and the frame 2, so as to avoid sheet wrinkle of the backlight source module due to the pressure generated between the optical sheet 5 and the frame 2 when both the light guide plate 4 and the optical sheet 5 are expanded.

As shown in FIGS. 1 to 3, according to an exemplary embodiment, the gap adjusting element 6 is disposed between the second stepped portion 22 of the frame 2 and the light guide plate 4, so as to facilitate adjusting the gap between the optical sheet 5 and the frame 2.

Specifically, as shown in FIGS. 1 to 3, the gap adjusting element 6 is disposed in a recess 23 in the frame 2. In this way, it facilitates mounting the gap adjusting element 6 and a thickness of the backlight source module is not to be increased. The recess 23 may be a continuous circumferential groove formed in a lower surface of the second stepped portion 22 of the frame 2. Alternatively, the recess may include several discrete grooves. Correspondingly, the gap adjusting element 6 may be a single piece of circumferentially extending material. Alternatively, the gap adjusting element 6 may include several discrete pieces of material. Further, the piece of material may include a cuboid or a cylinder.

According to an embodiment of the present disclosure, a thermal expansion coefficient of the gap adjusting element 6 may be larger than a thermal expansion coefficient of the frame 2. In this way, in the high-temperature and high-humidity test, an expansion amount of the gap adjusting element 6 may be larger than an expansion amount of the frame 2, so that the gap adjusting element 6 may lift the frame 2 upward. As a result, a larger gap P is generated between the frame 2 and the optical sheet 5. In this way, the optical sheet 5 and the light guide plate 4 underneath it may be expanded freely without being pressed against the frame 2, so as to avoid the sheet wrinkle of the backlight source module.

On the other hand, when the temperature of the backlight source module is lowed after the high-temperature and high-humidity test, a shrinkage amount of the gap adjusting element 6 is larger than a shrinkage amount of the frame 2 because the thermal expansion coefficient of the gap adjusting element 6 is larger than the thermal expansion coefficient of the frame 2, so that the gap P between the frame 2 and the optical sheet 5 is reduced. In this way, it is helpful for the frame 2 to hold the optical sheet 5 together with the light guide plate 4 and the bottom reflective sheet underneath it onto the backplate 1 firmly, so as to prevent the optical element from being moved and scratched.

Specifically, the frame 2 may be made of polycarbonate (PC) or glass fiber reinforced polycarbonate, and a thermal expansion coefficient γ thereof may be about $2 \sim 3 \times 10^{-5}/° C$.

The gap adjusting element 6 may be made of polyvinyl chloride (PVC), and a thermal expansion coefficient γ thereof may be about $6\sim7\times10^{-5}/°C$. Alternatively, the gap adjusting element 6 may be made of ABS resin (Acrylonitrile Butadiene Styrene), and a thermal expansion coefficient γ thereof may be about $7.38\times10^{-5}/°C$.

According to an embodiment, an end portion of the frame 2 contacting the optical sheet 5 employs a rounded corner design in order to prevent the frame 2 from scratching the optical sheet 5. Specifically, as shown in FIG. 1, an end 24 of a front end portion of the first stepped portion 21 of the frame 2 contacting the optical sheet 5 employs the rounded corner design.

Further, an end portion of the frame 2 contacting the light guide plate 4 also employs a rounded corner design in order to prevent the frame 2 from scratching the light guide plate 4. Specifically, as shown in FIG. 1, an end 25 of a front end portion (left side as shown) of the second stepped portion 22 of the frame 2 contacting the light guide plate 4 employs the rounded corner design.

According to an embodiment, there is a gap C1 between a side portion of the optical sheet 5 and the frame 2. Specifically, as shown in FIG. 1, there is a gap C1 between the side portion of the optical sheet 5 and a rear end portion (right side as shown) of the first stepped portion 21 of the frame 2. In this way, in the high-temperature and high-humidity test, the optical sheet 5 is allowed to expand laterally (i.e. in a horizontal direction as shown in FIG. 1) so as to prevent the optical sheet from being crimped.

Further, there is a gap C2 between a side portion of the light guide plate 4 and the frame 2. Specifically, as shown in FIG. 1, there is a gap C1 between the side portion of the light guide plate 4 and a rear end portion of the second stepped portion 22 of the frame 2. In this way, in the high-temperature and high-humidity test, the light guide plate 4 is allowed to expand laterally (i.e. in a horizontal direction as shown in FIG. 1) so as to prevent the light guide plate 4 from being crimped.

The backlight source module according to the exemplary embodiments of the present disclosure is described as above. Moreover, it should be appreciated by those skilled in the art that it is possible to make various changes in the structure of the backlight source module according to the embodiments without departing from the general concept of the present disclosure. For example, the gap adjusting element 6 may be disposed at other positions of the frame 2, for example, between the frame 2 and the backplate 1. Alternatively, the gap adjusting element 6 may be disposed directly between the frame 2 and the light guide plate 4 without providing the recess in the frame 2. As long as the gap adjusting element 6 has a thermal expansion coefficient which is large enough to lift the frame 2 when being heated, the gap between the optical sheet or the light guide plate and the frame may be adjusted, as described above. All these changes should fall into the scope of the present disclosure.

In the backlight source module according to the embodiment of the present disclosure, the gap adjusting element is provided to adjust the gap between the optical sheet and the frame in the direction perpendicular to the backplate, so that it allows to set suitable gaps between the optical sheet and the frame both during the vibration test and during the high-temperature and high-humidity test, so as to prevent the backlight source module from being damaged during the tests.

According to another aspect of the prevent disclosure, it is provided a display device comprising the backlight source module according to the above embodiments. As the backlight source module is difficult to be damaged, the display device has a reliable display performance. The display device may include a mobile phone, a tablet, a notebook computer, a monitor, a television and so on.

The foregoing embodiments are merely illustrative of principles and constructions of the present disclosure and are not intended to limit the present disclosure. Moreover, it should be appreciated by those skilled in the art that any changes and modifications thereto without departing from the general concept of the present disclosure will fall into the scope of the present disclosure. The scope of the present disclosure should be defined by appended claims of the present application. It is to be noted that words "comprise", "comprising", "include" and "including" do not exclude other elements or steps, and the word "a" or "an" does not exclude a plurality of elements modified by it. In addition, any reference numerals in the claims should not be construed as limiting the scope of the present disclosure.

What is claimed is:

1. A backlight source module comprising:
   a backplate;
   a bottom reflective sheet, a light guide plate and an optical sheet which are stacked on the backplate in that order; and
   a frame disposed at peripheral edges of the backplate for holding the bottom reflective sheet, the light guide plate and the optical sheet on the backplate,
   wherein the frame presses against the optical sheet in a direction parallel to a light emission direction in a first state, the light emission direction being a stacking direction in which the bottom reflective sheet, the light guide plate, and the optical sheet are stacked, and
   wherein the backlight source module further comprises a gap adjusting element configured to generate and adjust a gap between the optical sheet and the frame in the direction parallel to the light emission direction in a second state different from the first state, such that heat generated in the second state results in thermal expansion of the gap adjusting element wherein the gap adjusting element is disposed in a recess of the frame, and
   a thermal expansion coefficient of the gap adjusting element is larger than a thermal expansion coefficient of the frame.

2. The backlight source module according to claim 1, wherein the frame comprises:
   a first stepped portion engaging with an edge of the optical sheet; and
   a second stepped portion engaging with an edge of the light guide plate,
   wherein the first stepped portion projects towards a center of the backlight source module from the second stepped portion.

3. The backlight source module according to claim 2, wherein the gap adjusting element is disposed between the second stepped portion of the frame and the light guide plate.

4. The backlight source module according to claim 3, wherein the frame is made of polycarbonate or glass fiber reinforced polycarbonate, and the gap adjusting element is made of polyvinyl chloride or ABS resin.

5. The backlight source module according to claim 3, wherein an end of the frame contacting the optical sheet employs a rounded corner design.

6. The backlight source module according to claim 3, wherein an end of the frame contacting the light guide plate employs a rounded corner design.

7. A display device comprising the backlight source module according to claim 3.

8. The backlight source module according to claim 2, wherein an end of the first stepped portion of the frame contacting the optical sheet employs a rounded corner design.

9. The backlight source module according to claim 8, wherein an end of the second stepped portion of the frame contacting the light guide plate employs a rounded corner design.

10. The backlight source module according to claim 2, wherein an end of the second stepped portion of the frame contacting the light guide plate employs a rounded corner design.

11. The backlight source module according to claim 2, wherein there is a gap between the frame and a side portion of the optical sheet in a direction perpendicular to the light emission direction.

12. The backlight source module according to claim 2, wherein there is a gap between the frame and a side portion of the light guide plate in a direction perpendicular to the light emission direction.

13. A display device comprising the backlight source module according to claim 2.

14. The backlight source module according to claim 1, wherein an end of the frame contacting the optical sheet employs a rounded corner design.

15. The backlight source module according to claim 1, wherein an end of the frame contacting the light guide plate employs a rounded design.

16. The backlight source module according to claim 1, wherein there is a gap between the frame and a side portion of the optical sheet in a direction perpendicular to the light emission direction.

17. The backlight source module according to claim 1, wherein there is a gap between the frame and a side portion of the light guide plate in a direction perpendicular to the light emission direction.

18. A display device comprising the backlight source module according to claim 1.

* * * * *